(12) United States Patent
Germiquet et al.

(10) Patent No.: US 6,842,402 B2
(45) Date of Patent: Jan. 11, 2005

(54) ELECTRONIC DIVING WATCH WITH ANALOG DISPLAY

(75) Inventors: Christophe Germiquet, Prêles (CH); Jean-Jacques Born, Morges (CH); Vincent Berseth, Neuchâtel (CH)

(73) Assignee: Asulab S.A., Marin (CH)

( * ) Notice: Subject to any disclaimer, the term of this patent is extended or adjusted under 35 U.S.C. 154(b) by 0 days.

(21) Appl. No.: 10/649,935

(22) Filed: Aug. 28, 2003

(65) Prior Publication Data
US 2004/0042343 A1 Mar. 4, 2004

(30) Foreign Application Priority Data
Sep. 4, 2002 (CH) .............................................. 1510/02

(51) Int. Cl.$^7$ ........................ G04B 47/00; G04B 47/06; G01L 9/00
(52) U.S. Cl. ............................. 368/10; 368/11; 73/753
(58) Field of Search ............... 368/10, 11; 73/291–295, 73/753–754

(56) References Cited

U.S. PATENT DOCUMENTS

| 3,613,354 A | | 10/1971 | Jenny | |
| 3,696,610 A | * | 10/1972 | Charbonnier | .................. 368/1 |
| 4,109,140 A | | 8/1978 | Etra | |
| 4,783,772 A | | 11/1988 | Umemoto et al. | |
| 5,251,190 A | * | 10/1993 | Miyasaka et al. | ............. 368/10 |
| 5,724,317 A | * | 3/1998 | Kubota et al. | ................. 368/11 |
| 6,385,134 B1 | * | 5/2002 | Lange et al. | .................. 368/11 |
| 6,490,230 B1 | * | 12/2002 | Sakuyama et al. | ............ 368/11 |

FOREIGN PATENT DOCUMENTS

EP 805 105 A2 11/1997

* cited by examiner

Primary Examiner—Vit W. Miska
(74) Attorney, Agent, or Firm—Sughrue Mion, PLLC

(57) ABSTRACT

An electronic diving watch (1, 100) with analog display is described, comprising bidirectional means for moving the hour (13) and minute (14) hands respectively. The watch provides a diving mode of operation in which the hands displaying the current time are also used to display data relating to the dive. More particularly, the hour hand (13) is used to provide information vital to the wearer of the watch, namely the maximum remaining duration before it becomes necessary to effect a decompression stage during the ascent. An embodiment is described in which the duration of a single stage at 3 meters is also indicated once the maximum remaining duration has been exceeded.

17 Claims, 3 Drawing Sheets

ELECTRONIC DIVING WATCH WITH ANALOG DISPLAY

The present invention relates to an electronic watch having functions dedicated to the performance of diving. More particularly, the diving watch according to the present invention is of the type comprising a sealed case containing a timepiece movement covered by a dial, the watch comprising at least first graduations corresponding to time indications, the timepiece movement comprising electronic circuits adapted to generate time signals for motor means controlling at least respective first and second analog display organs, the analog display organs being disposed above the dial to display the current time in a first mode of operation called the time mode, the watch further comprising a pressure sensor adapted to produce electric signals representing the surrounding pressure and to supply the signals to the electronic circuits, the diving watch having at least a second mode of operation in which display of data relating to the performance of diving is provided.

Similar products have already been described in the prior art. The U.S. Pat. No. 4,783,772 in particular describes an analog electronic watch fitted with a pressure sensor enabling it to display data relating to the performance of diving. This data, as well as information relating to supplementary functions, such as an alarm for example, are displayed on an additional liquid crystal screen located at twelve hours on the dial of the above-mentioned watch. However, the nature of the available information on the described product is limited to information of the type of the instantaneous depth, the duration of the current dive and the maximum depth attained. As a result, the utilisation of this information in terms of safety requires recourse to independent decompression tables to define the parameters for ascent, in particular the determination of the maximum duration during which the user can remain submerged before having to perform at least one decompression stage. Furthermore the readability of the liquid crystal screen is limited because of its small dimensions, especially under the conditions of a dive.

A first object of the present invention is to alleviate the above-mentioned problems of the prior art by providing a diving watch indicating to its user information relating to his safety during his dive.

Another object of the invention is to provide a diving watch enabling its user to observe the above-mentioned information with great ease, in other words to implement a diving watch having good readability of its information.

With this object the invention provides in particular a diving watch of the type specified above, characterized by the fact that the display of the data relating to the performance of diving is effected by at least one of the analog display organs in connection with the first graduations corresponding to the time indications, by the fact that the data relating to the performance of diving are representative of the maximum remaining duration during which the user of the watch can continue with a current dive before needing to perform a decompressing stage during the ascent, and by the fact that the first display organ is further arranged to be able to move in the anticlockwise sense relative the first graduations to indicate the remaining duration.

Most of the time, for an occasional diver, knowledge of the maximum remaining duration before having to perform a decompression stage during the ascent is sufficient. The depths attained in diving by this type of users are generally limited to 20 or 30 meters, which allows staying submerged for reasonable durations, of the order of some tens of minutes, without being forced to perform decompression stages.

Thus the diving watch according to the invention forms an advantageous alternative, especially because of its simplicity, to the use of decompression tables combined with reading the elapsed time on a sealed watch of conventional type, for carrying out small dives. Moreover it is provided to process the measurements made by the pressure sensor on the basis of a decompression algorithm selected from a set of algorithms known in the sphere of diving. Thus the maximum remaining duration is calculated taking into account the actual parameters of the current dive, as is the case with a diving computer of conventional type, which is also more precise than the method based on the use of decompression tables.

Furthermore it may be noted that, to the extent that the display of the data relating to diving is realised by a display organ used in normal times to display the time, excellent readability is ensured. Thus the display area of the diving watch according to the present invention is not encumbered with supplementary display elements to display supplementary functions.

In general terms it is provided to use means for controlling the respective movements of the hour and minute hands, allowing rotational movements in both senses. It is also provided to use means for activating a diving mode of operation, starting in the time mode, in an automatic manner. Obviously it is possible to utilise activation of manual type for this mode of operation, for example by pressing a button.

In a first embodiment of the present invention, it is provided in the diving mode that means calculate the maximum remaining duration before having to perform a decompression stage during the ascent and control the hour hand to display this duration. This latter is thus indicated relative to the minute graduations provided on the watch for the time mode of operation. Furthermore and in a preferred manner, means are also provided to control the minute hand in this mode of operation, so that it displays at each instant the instantaneous depth at which the wearer of the watch is.

In a preferred variant, second graduations are present on the dial to improve the readability of the remaining duration, by virtue of their proximity to the end of the hour hand. This feature further allows addition of specific indications, such as a first zone exhibiting a first background colour, followed by a second end zone of graduations denoted by a different background colour, such as orange for example. A third red zone can be provided following the second zone, allowing the diver to be shown that he should wait at some meters depth before ascending to the surface, in the case in which he has exceeded the maximum remaining duration before having to perform a decompression stage. Such a configuration enables the attention of the diver to be drawn to the near end of the dive without a decompression stage in the second orange zone, to tell him to start the ascent without delay.

In a second embodiment, supplementary means are provided so that the diving watch according to the present invention indicates, in addition to the maximum remaining duration and when this latter has reached a value of zero, the duration of a single stage to be carried out at a predetermined depth, generally fixed at 3 meters. Such a watch is thus suitable for dives deeper and longer overall than in the case of the first embodiment. Thus second circular graduations are also provided, these being subdivided into at least two different zones, of which one shows a specific time scale indicating the duration of the stage. The specific time scale preferably covers a maximum stage duration of the order of 20 minutes.

Supplementary functions common to different embodiments can also be implemented. In particular it can be provided that, in the diving mode, the hour and minute hands will be controlled in response to actuation of a control member, to display respectively the elapsed duration of the current dive and the maximum depth attained during the course of the dive.

It can also be provided that, in the time mode, the hour and minute hands will display, in response to actuation of a control member, respectively the total duration of the last dive and the maximum depth attained during it.

It is also provided to implement a third mode of operation or historical mode, accessible by pressing a control button in the time mode of operation. In the historical mode, means can be provided to allow the hour and minute hands to reproduce their behaviour in the last dive at an accelerated rate.

The invention will be better understood from the following description of various embodiments, with reference to the accompanying drawings, in which.

Figure 1:
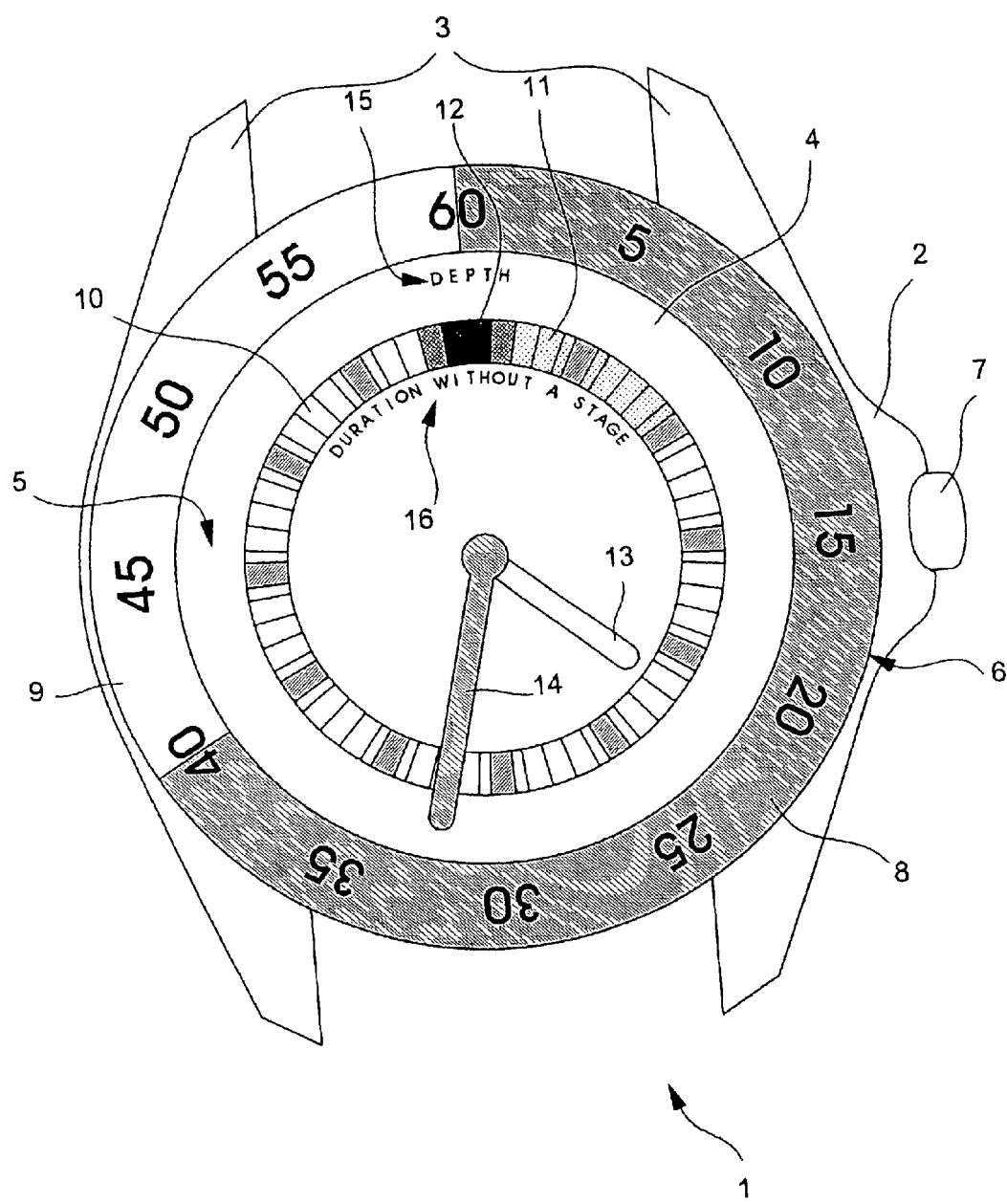
FIG. 1 is face view of the diving watch according to a first embodiment of the present invention.

FIG. 1 shows the diving watch according to the present invention in a very simple preferred embodiment, from the point of view both of its structure and of its operation. The watch 1 looks like a watch of conventional type. Thus it comprises a case 2 which may be for example of the type having its middle and back cover moulded in one piece in plastic material, comprising horns 3 for attaching a bracelet (not shown) and containing in particular a timepiece movement (not shown), and a dial 4 and being closed on its top side by a glass 5, having a fixed bezel 6 at its periphery. The watch 1 further comprises a single control member 7, namely a winding-button which can be used in particular both as a push-button as well as for its conventional use in rotation.

The bezel 6 carries first minute graduations extending from a first indication at 5 minutes up to a last indication at 60 minutes, two successive graduations being spaced by 5 minutes. It is noted that the graduations are divided into two adjacent parts, preferably indicated by different colours. The first part 8 extends from the twelve hour position up to the 8 hour position, corresponding to the 40 graduation and the second part 9 extends from the 40 graduation up to the twelve hour position.

The dial 4 has second circular graduations, whose unit is the minute, subdivided into three zones. The first zone 10 extends, in the anticlockwise sense of rotation, from the position corresponding to the first graduation of 59 minutes up to the position corresponding to the first graduation of 10 minutes. The second zone 11 extends, in the anticlockwise sense of rotation, from the end of the first zone 10 up to the position corresponding to the first graduation of 1 minute. The third zone 12, smaller than the two preceding, extends between the positions corresponding respectively to the first graduations for 1 minute and 59 minutes in the anticlockwise sense. The first, second and third zones 10, 11 and 12 likewise have different respective colours.

The watch 1 also comprises two hands, indicating the hours 13 and the minutes 14 respectively. It may also be noted that the hour and minute hands 13 and 14 have the same colours as the first zone 10 of the second graduations and the first portion 8 of the first graduations respectively.

The dial 4 carries supplementary indications, given here by way of example, in particular the word "depth" 15 located at the periphery of the dial, and the expression "duration without stage" 16 located directly inside the second graduations. These supplementary indications 15 and 16 thus almost form the only indications on the watch according to the invention which can suggest to an observer that the latter has functions supplementary to a conventional watch.

Thus the watch 1 comprises special technical means, which will be described briefly below in connection with FIG. 2 and which allow indications vital to its wearer in the sphere of practising diving to be provided. These technical means comprise in particular a pressure sensor allowing the surrounding pressure external to the watch to be measured at each instant and converting this value into depth in the course of diving. These techniques have been described in many prior art documents and are not dealt with in more detail in consequence.

Thus, by suitably programming the electronic circuit of the watch according to the present invention, a first mode of operation or time mode is provided, in which the conventional functions are provided by the hour and minute hands. Furthermore the winding-button 7 has two stable positions and one unstable position, a first stable position being the position of rest in which the winding-button does not perform any function. In conventional manner the second stable position is a withdrawn position relative to the rest position, in which the winding-button allows the time indicated by the two hands 13, 14 to be regulated by rotation. The unstable position is attained by pressing on the winding-button in the direction of the watchcase 2, a spring (not shown) being provided for return to the rest position when the pressure ceases, in the manner of a push button. Each press effected on the winding-button 7 allows the watch to be controlled to effect modification of the current display and to display information whose nature depends on the state of the watch 1 at the moment of pressing.

Conventional means are provided to effect a change of the mode of operation automatically, in particular to switch from the time mode to a second mode of operation, called the diving mode, when a dive starts. These means allow reversion to the time mode in an automatic manner, leaving the diving mode when the diver wearing the watch surfaces. To this end use may be made for example of two ohmic contacts (not shown), each of which has a part located outside the case 2 of the watch 1, which external part comes into contact with the water during a dive. These two contacts thus form a switch which is open when the watch 1 is out of the water and closed when it is submerged in the water. The closure of this switch triggers automatic activation of transfer to the diving mode. Another possible embodiment for detecting immersion of the watch consists in positioning at least one electrode in the glass of the watch so as to form a variable capacitance capacitor with the outer surface of the glass, allowing the presence of water on the glass to be detected. It is also possible to conceive utilisation of signals provided by the pressure sensor, either in an alternative manner to what has been described or to supplement it, for enabling or disabling the diving mode. In this case the electronic circuit of the watch can be adapted to activate the diving mode in response to detection of an increase in the surrounding pressure above a predetermined value.

Obviously, as has been mentioned above, it is possible to provide manual means for activating the diving mode in a manner additional to or instead of the automatic activation described above. In particular a supplementary control member can be provided to perform this function.

These means forming part of the state of the art will not be discussed further in the present patent application, to the extent that they do not form the heart of the present invention and that the man skilled in the art will not have any particular difficulty in implementing them.

Once the diving mode is activated, the respective functions associated with the hour and minute hands 13 and 14 are to display the maximum remaining duration for which the user of the watch 1 can continue a current dive before having to perform a decompression stage during the ascent and to display the present depth.

Thus, when the diver enters the water, which activates the diving mode, the two hands 13 and 14 are positioned respectively facing the indication corresponding to 58 minutes on the bezel 5 and at twelve hours, in other words facing the indication 60 minutes. When the diver descends, the minute hand 14 is turned to indicate the value of the present depth opposite the first minute graduations 8 and 9, while the hour hand 13 initially stays fixed at the 58 minutes position.

It is noted that the readability of the depth indication is excellent, in particular because the colours of the minute hand 14 and the first portion 8 of the first graduations are identical. This likeness of the colours thus facilitates an intuitive association of the hand with the corresponding graduations. Furthermore the graduations used to read the depth being the same as those used to indicate minutes, the case 2 of the watch is not encumbered with useless indications, further facilitating the accessibility of the information which is provided.

It can also be noted that the second portion 9 of the first graduations starting at the indication of 40 meters (or minutes) is preferably of a different colour than the first part 8, to provide supplementary information to the diver concerning his safety. Thus, beyond a depth of 40 meters, the maximum remaining duration without having to perform a stage during the ascent decreases very rapidly below 10 minutes and thus requires closer attention on the part of the diver. The configuration being described thus allows the diver to be alerted by a glance to possible exceeding of this limit and thus that he is in a more delicate situation than usual.

The value of the maximum remaining duration can be calculated on the basis of various algorithms obtained from numerous medical studies which have been carried out on the phenomena of decompression of gas in the human body. The choice of the algorithm is not of much importance either to the understanding of the present invention or to its implementation by the man skilled in the art, who can select an algorithm from the most recent generally accepted ones in the sphere of diving. In general terms, the maximum duration depends on the pressure level to which the body of the diver is exposed as well as on the duration of the exposure. This remaining duration thus diminishes more rapidly when the depth at which the diver is located increases. It can be noted that the value of the maximum remaining duration further depends on supplementary parameters, such as in particular the recent "history" of the diver, i.e. the fact that he has recently carried out one or more dives, or even the altitude of the surface in the case of a dive carried out in a lake at an altitude above the sea level for example.

Means are provided in the electronic circuits of the watch to take into account the set of these parameters and to calculate the maximum remaining duration on the basis of the algorithm held to program the watch.

In particular, a supplementary advantage of the watch according to the present invention, especially compared with diving computers, is provided by its simple design, allowing its user to wear it outside the activity of diving. Thus the recent history of the user from the point of view of diving is taken into account in the calculations of the maximum remaining duration.

When the body of the user has not been subjected to excess pressure recently, his state of saturation is zero, in other words his body does not exhibit physiological changes from the point of view of performing diving. In this case, when the user starts a dive, the value of the maximum remaining duration is of the order of several hours so long as the user does not exceed a depth of the order of ten meters. The further the diver descends, the more rapidly the maximum remaining duration reduces until it reaches 58 minutes. As from this moment, the hour hand 13 begins to turn anticlockwise in order to indicate this value at each instant with respect to the minutes graduations.

Thus it will be understood in general terms that, when the remaining duration is less than 58 minutes, the hour hand 13 turns at a constant speed, at the rate of one graduation per minute, so long as the diver remains at a given depth and that it turns at more than one step per minute when the diver descends. On the other hand, when the diver ascends, the maximum remaining duration increases because the surrounding pressure of the diver decreases, which results in the hour hand 13 starting to turn clockwise.

In accordance with what has been described above, the dial 4 has second circular graduations 10, 11 and 12, allowing the readability of the watch 1 according to the present invention to be improved. In particular it is provided to use the same colour for the first zone 10 of the second graduations as for the hour hand 13, in order to facilitate an intuitive association between these two elements at the instant of reading the remaining duration. Furthermore the second zone 11 of the second graduations, which corresponds to a remaining duration less than 10 minutes, is preferably of orange colour to draw the attention of the diver when the hour hand 13 comes into this range. Likewise, the third zone 12 is preferably red to tell the diver that the remaining duration has elapsed and to warn him about the fact that he risks encountering decompression problems in the case of a direct ascent to the surface.

The excellent readability of the diving watch 1 according to the present invention may be noted, since the display is simple and only adopts a structure well-tried over several centuries, namely an analog display system, preferably by hands, although the use of rotating discs carrying index marks is conceivable. Thus it needs very little time for the diver to ascertain the situation in which he is present in relation to the current dive, when he consults his watch. Thus, reading the remaining duration in minutes is intuitive, since it is similar to reading the minutes in the time mode.

Supplementary functions are also provided in the diving watch 1 and can be accessed by pressing the winding-button 7. The nature of the accessible functions and the way in which they are accessed are given by way of non-limiting example.

Means are provided to control the hour and minute hands 13 and 14 in response to pressing the winding-button 7 in the diving mode, in such a manner that they respectively display the elapsed duration of the dive and maximum depth attained during the current dive. An automatic return to the diving mode can then be provided after an interval of time of some seconds. It can also be provided that the return to the diving mode is obtained by an additional actuation of the winding-button 7.

On the other hand, additional means are provided to control the hour and minute hands 13 and 14 in response to pressing the winding-button 7 in the time mode, in such a manner that they respectively display the total duration and the maximum depth attained during the last dive. A return to the time mode can then be provided automatically or obtained by an additional actuation of the winding-button 7. Equally it can be provided that the electronic circuit of the watch 1 comprises memory zones sufficient in number to store the parameters, namely the total duration and the maximum depth of the last five dives for example. In this case it can be provided for example that a long actuation of the winding-button 7 in the time mode initiates transfer to a display mode of the parameters of the last dives, the selection of the dive being effected by short successive actuations of the winding-button 7 and the return to the time mode preferably being automatic or obtained by an additional long actuation of the winding-button 7. In this latter instance, means can also be provided to control the hands 13 and 14 so that they are superposed opposite graduations 8 and 9 for a predetermined duration of the order of some seconds, so as to indicate the rank of the dive whose parameters are automatically displayed after the predetermined duration.

It can also be provided that, in the case of storing the parameters of the last dive(s), a new action on the winding-button 7 initiates a supplementary mode of operation, called the historical mode. The watch can either be programmed so that this latter activation takes place in response to a new long actuation during the mode of displaying the parameters of the last dives or even in response to a double actuation during the time mode for example. In order to implement this historical mode, means are provided to control the hour and minute hands 13 and 14 in such a manner that they reproduce at an accelerated rate the behaviour which they have respectively presented during the selected preceding dive. It is possible for example to program the electronic circuit of the watch so that one minute of the last dive is reproduced in one second in the historical mode.

The historical mode is of major interest in the question of safety, since it allows the profile of the selected dive to be visualised rapidly, which provides extremely important information for doctor called following a diving accident. Normally a doctor can perform visualisation of the diving profile by transferring the data from a diving computer to a reading and operating terminal, possibly of the type of a personal computer. The historical mode according to the present invention provides an advantage over the devices pertaining to the state of the art in terms of access speed to this information. Furthermore, the advantages explained above, concerning the readability of the diving watch 1 according to the invention apply equally to the use of the historical mode. The visualisation of the profile of the selected dive is easy enough from observation of the displacement of the hands 13 and 14 at an accelerated rate.

On the other hand, adaptation of the time and depth scales can be provided as functions of the respective values of the duration and depth of the reproduced dive. Such a device allows the parameters relating to a dive without breathing apparatus, for example, to be displayed with good readability. In this latter case the watch according to the invention can be programmed so that the historical mode takes place in real time and so that a variation in depth of 1 meter is represented by variation of 10 minutes on its dial. Obviously these values are only given here by way of indications and the man skilled in the art is capable of modifying them without encountering any particular difficulties.

Figure 2:
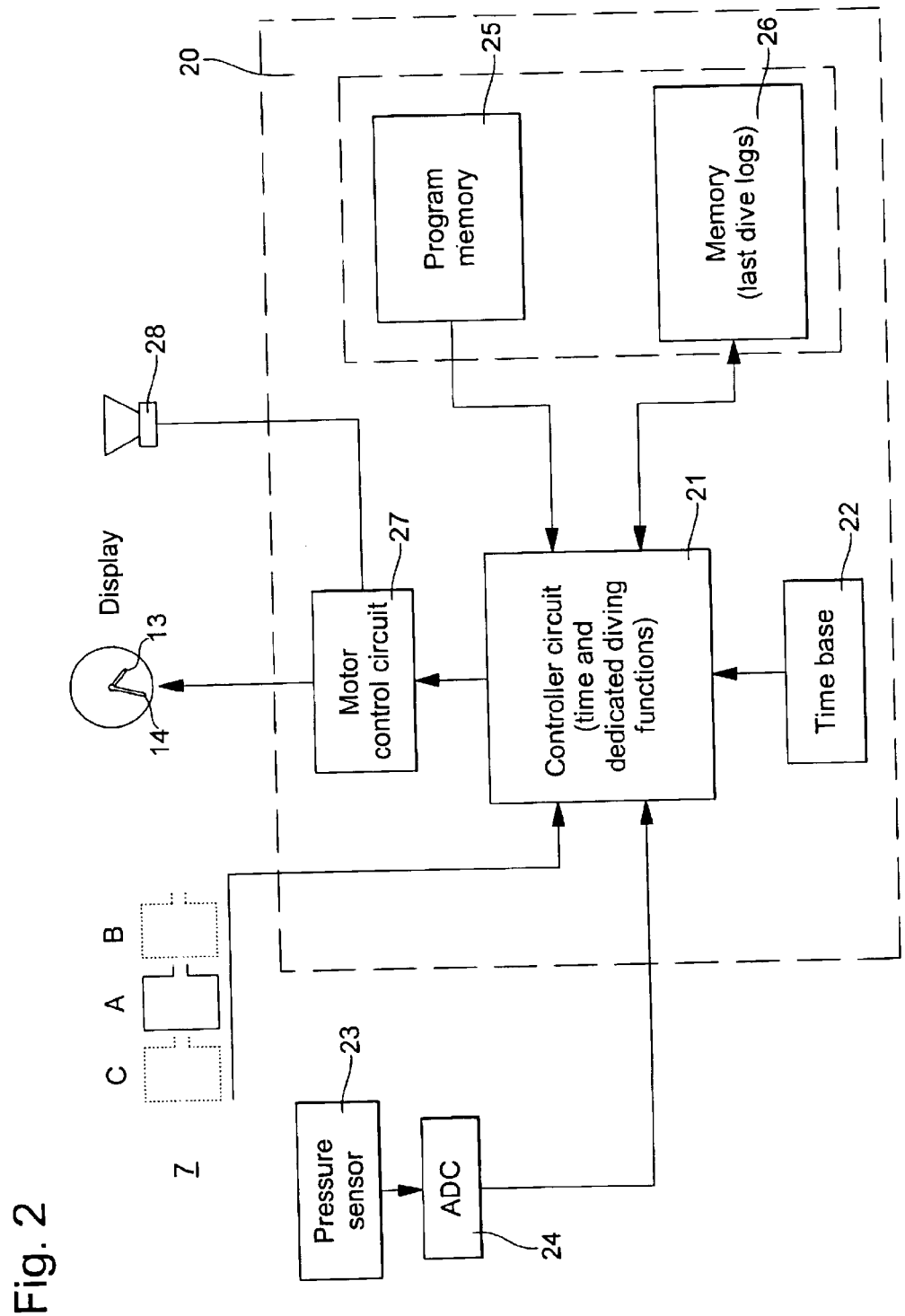
FIG. 2 is a block diagram of the electronic circuit of the diving watch according to the present invention.

FIG. 2 is schematic diagram of the general structure of the electronic circuit of the diving watch according to the present invention.

In general terms, the electronic circuit of the watch comprises in particular an integrated circuit 20 comprising a controller circuit 21 adapted to manage the conventional time functions of the watch 1 and comprising to this end a time division circuit connected in particular to an resonator 22 providing a time base. Time information is provided from this time base by the controller circuit 21, in particular to ensure the functions of the time mode and the functionalities relating to the diving mode.

The controller circuit 21 furthermore receives input signals generated by a pressure sensor 23 which generates analog electric signals representing the surrounding pressure. These signals are converted by an analog-to-digital converter 24 before being fed as input to the controller circuit 21 in the form of a digital signal.

The pressure sensor 23 is of conventional type and the one skilled in the art will not encounter any particular difficulty in selecting one which is adapted to implementing the present invention.

The integrated circuit 20 also comprises memory zones, in particular a first memory zone 25, preferably of non-volatile type, holding a program enabling the controller circuit 21 to perform the calculations relating to the diving mode on the basis of a decompression algorithm. The selection of a re-programmable non-volatile memory (flash or EPROM for example) allows possible later modification of the calculating program as a function of the stored decompression algorithm. The integrated circuit 20 comprises in a preferred manner at least a second memory zone 26, also of non-volatile type, in which the measurements along with results from the calculations effected by the controller circuit 21 are stored periodically. This second memory zone 26 is in particular provided to store the diving logs, i.e. the measurements of depth and the corresponding time measurements relating to the last dive or dives as the case may be. Thus this information is referred to by the controller circuit 21, especially when the watch is in the historical mode.

The controller circuit 21 determines the situation and state of the diver, from the point of view of diving practise at each instant on the basis of these respective input signals. To this end it may in particular be provided that, in the time mode the pressure is measured every five minutes and in the diving mode the pressure is measured every two seconds for example. On the basis of all these periodic measurements and on the basis of the program stored in the first memory zone 25, the controller circuit 21 determines a certain number of parameters relevant to the health of the diver, i.e. in particular the residual rate of nitrogen dissolved in his body and the quantity of micro-bubbles formed.

The decompression algorithm is preferably stored in the first memory zone 25 in the form of a computer program. Its use, on the basis of the measured and/or calculated information enables the controller circuit 21 to calculate the maximum remaining duration for the current dive, before the diver will be obliged to effect a decompression stage during the ascent. The controller circuit 21 then sends adapted signals to a control circuit 27 of bidirectional motors, in such a manner that the hour hand 13 displays the remaining duration, when appropriate, i.e. when this duration is less than 58 minutes. Likewise the controller circuit 21 produces adapted signals for the control circuit 27 of the motor means, for example two bidirectional motors, in such a manner that the minute hand 14 displays the instantaneous depth opposite the minute graduations 8 and 9 on the bezel 6 of the watch.

In a preferred variant, an alarm is provided, which may be visual or preferably audible, whose function is to warn the diver when the maximum remaining duration reaches a low value, for example of the order of two minutes. Thus, when this alarm is triggered, the diver knows that he should monitor the course of the maximum remaining duration with great attention or even that he should start to ascend to ensure his safety. An acoustic vibrator, otherwise called a buzzer 28, of conventional type such as a piezoelectric element, is provided to implement this alarm, the vibrator being controlled by the controller circuit 21. These features will not be developed further here to the extent that the implementation of the alarm is conventional and will not pose any particular difficulty to a man skilled in the art.

It is possible that the diver makes two or more dives in intervals of time less than the interval of time necessary physiologically for a preceding dive to be without influence on the following dives. In this case it is necessary to take into account the preceding dive or dives in the calculation of the time needed in particular for the elimination of residual nitrogen in the body of the diver during the later dive.

To the extent in which it is provided that the pressure sensor 23 effects measurements of the surrounding pressure constantly, in a periodic manner, whether the user of the watch be diving or on the surface, the data supplied to the controller circuit 21 for effecting the calculations on the basis of the decompression algorithm are sufficient to ensure good precision of the results. Thus the dives possibly made in a close manner are also taken into account to calculate the maximum remaining duration before having to perform a decompression stage. Equally, if the user of the watch goes to an altitude above the sea level to dive in a lake, he experiences low surrounding pressure and is in a phase of progressive de-saturation. Thus, in a first period of time, his physiological state which is not completely adapted to the surrounding pressure is taken into account by the watch according to the present invention as the initial state, since the measurements taken during this short period of ascent by the pressure sensor 23 are also integrated into the utilisation of the program of the watch, the algorithm which is used taking such parameters into account.

For this reason a supplementary advantage of the diving watch according to the invention appears from its design. Thus, because of the discreet appearance, which is not generally the case with diving computers, the present watch can be worn under any circumstances and thus continuously. Thus its user is not obliged to anticipate a next dive so as to wear the watch, with the object of ensuring that the pressures experienced before the dive will be followed, to the extent that he can wear the watch continuously without making any concessions to design.

On the other hand, the electronic circuit of the watch comprises conventional means (not shown) for detecting actuations of the winding-button 7 made by the user. This winding-button is in a position A at rest and has two extreme positions B and C. The position B, which is unstable, is obtained by a press by the user and activates a function of the controller circuit 21 which modifies the mode of operation of the watch, such as has been described above. When the winding-button 7 is pushed into the position B from the time mode, the controller circuit 21 generates signals for the motor control circuit 27 in such a manner that the hour and minute hands 13 and 14 respectively display the total duration and the maximum depth of the last dive. Moreover, in accordance with what has been described above, activation of the historical mode can be reached by a long actuation of the winding-button 7 in the position B, starting from the display mode of the parameters of the last dive, or by a double actuation starting from the time mode. On the other hand, when the winding-button 7 is pushed into the position B from the diving mode, the controller circuit 21 generates signals for the motor control circuit 27, in such a manner that the hour and minute hands 13 and 14 display respectively the elapsed duration and the maximum depth attained since the start of the current dive.

Obviously the man skilled in the art is capable of programming the integrated circuit 20 of the watch according to the present invention as he desires in order to provide respective responses adapted to different possible actions on the winding-button 7.

Furthermore, conventional means well known to the man skilled in the art are implemented to allow a setting of the current time indicated by the hands 13 and 14 in the time mode, when the winding-button 7 is withdrawn into the stable position C.

On the other hand, it should be noted that, in practice, any dive should normally comprise a stage called the comfort or safety stage, at a depth of some meters and for some minutes, generally 5 meters for 3 minutes, even in the absence of risks due to decompression phenomena.

According to the embodiment which is being described, the diver can, when he effects his ascent, stop at a predetermined depth, 5 meters for example, and press the winding-button 7 to see the elapsed time since the start of the dive in progress. It then only remains for him to press the winding-button 7 from time to time during the desired duration for the safety stage, for example 3 minutes, to wait for resurfacing.

In a variant implementation, means may be provided for displaying a countdown of predetermined duration, of the order of 3 minutes, starting from the moment when the diver has ascended to a predetermined depth, preferably around 5 meters. It can be provided for example that if the diver stays for more than 10 seconds at 5 meters, with a certain tolerance for the value of the depth, the controller circuit 21 automatically activates a mode of displaying the countdown. In the countdown mode, the function of the minute hand 14 remains unchanged relative to the diving mode while the hour hand 13 indicates the remaining time with an initial value of 2 minutes and 50 seconds. In this case it can be provided that one turn round the dial 4 corresponds to 3 minutes and thus that the hour hand 13 starts from a position located between 55 and 60 minutes and turns anticlockwise, continuously or by steps of 5 seconds for example.

Obviously the numerical values given above have been given in a non-limiting manner to illustrate the functioning of the watch according to the invention.

The structure of the electronic circuit of the diving watch 1 according to the present invention will not be dealt with in more detail to the extent that is does not form the heart of the invention. Furthermore numerous examples of implementation are available in documents of the prior art and the man skilled in the art will not have any difficulty in obtaining them.

Figure 3:
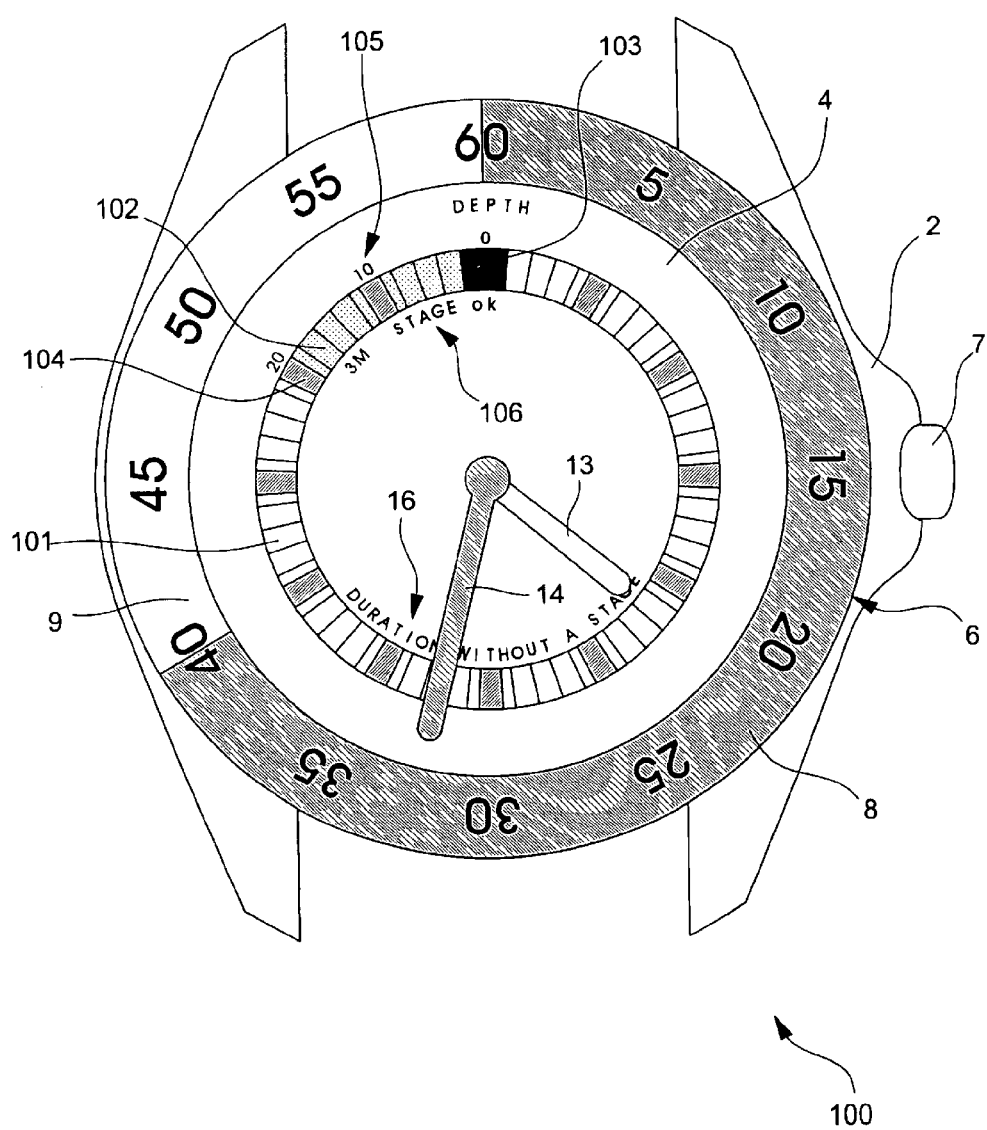
FIG. 3 is a face view of the diving watch according to a second embodiment of the present invention.

FIG. 3 shows a second embodiment of the diving watch 100 according to the present invention, for which a large number of technical elements are common with the first embodiment. The reference numerals used for the detailed description of the first embodiment are retained for the identical elements repeated in the second embodiment.

The general appearance of the diving watch 100 according to the second embodiment is the same as in the preceding embodiment, the differences being present in the area of the second graduations carried by the dial 4.

Thus the diving watch 100 is intended for a type of diver who tends to make dives without a stage or with a single stage, preferably fixed at 3 meters depth. In particular a choice may be made to limit use of the watch 100 to dives in the course of which a decompression stage will be necessary at 3 meters for 20 minutes maximum for example, the possibilities of diving still being interesting in this case.

As a result, in the second embodiment of the diving watch, the second graduations carried by the dial 4 comprise a first zone 101 indicating the maximum remaining duration and a second zone 102 indicating the duration of the stage to be effected at 3 meters depth. In the embodiment shown in FIG. 3 the second graduations also comprise a third zone 103, centred on the position corresponding to the indication 60 minutes of the first graduations 8, 9, extending over a sector corresponding to 2 minutes. This third zone 103 is a neutral zone whose function will be better explained below.

The ground of the first zone 101 is preferably realised in the same colour as the hour hand 13 for the reasons explained above, while the second zone 102 is preferably realised on a red ground. So far as the third zone 103 is concerned, a third colour can be used to colour its ground, preferably green.

It is noted that, in order to allow indication of the maximum remaining duration by the hour hand 13 in relation to the indications of minutes carried by the bezel 6, the first zone 101 of the second graduations extends in the anticlockwise sense between a first arbitrary position 104 and the position corresponding to 1 minute. In the embodiment shown here, the first position 104 corresponds to that of the indication of 50 minutes. Thus the second zone 102 of graduations extends in the anticlockwise sense between the positions 59 and 50 minutes. Supplementary indications 105 have been placed on the dial opposite the second zone 102 of graduations to indicate that this latter is adapted to display durations running from 0 to 20 minutes, an indication being provided in steps of 5 minutes. Equally an indication "STAGE 3m" 106, has been added inside the second zone 102 of the second graduations to clarify the function to the user of the watch 100.

The diving watch 100 preferably operates in the following manner. When the diver enters the water, the watch 100 automatically passes from the time mode to the diving mode, the hour and minute hands 13 and 14 change from displaying the time to displaying the maximum remaining duration and the instantaneous depth respectively. Initially the maximum remaining duration has a very large value, in any case greater than 50 minutes. As in the preceding embodiment, the hour hand 13 is in this case positioned at 49 minutes, i.e. near the second zone 102 of the second graduations and stays fixed as long as the remaining duration is greater than 49 minutes.

When the diver descends to a sufficient depth, as explained previously, starting from a certain duration of the dive and as a function of the depths attained, the maximum remaining duration progressively reduces to 49 minutes. At this instant the hour hand 13 is started moving in order to indicate the maximum remaining duration in a precise manner, through rotation in the anticlockwise sense with respect to the minute indications carried by the bezel 6 and the second graduations 101.

From a certain duration of the dive, a decompression stage becomes necessary. In this case the hour hand 13 jumps directly from the indication of 1 minute remaining without a decompression stage to the indication of the duration of the stage to be effected displayed with respect to supplementary indications 105 of the second zone 102 of the second graduations. So long as the diver remains at a sufficient depth, the hour hand 13 turns anticlockwise to display the corresponding increase in the stage duration. It may be noted that the duration of the stage to be effected at 3 meters calculated on the basis of the decompression algorithm corresponds, preferably at each instant, to the duration of the stage to be effected by the diver if he ascends starting from this instant at a predetermined speed, generally of the order of 10 meters per minute, up to the depth of 3 meters.

During the ascent, when the diver reaches 3 meters depth, the hour hand 13 turns at a substantially constant speed to display a kind of countdown of the duration of the stage to be effected. In fact, if the effective depth at which the diver is located during the decompression stage fluctuates, which is detected by the pressure sensor 23, the calculation of the duration of the stage takes these fluctuations into account to keep the remaining duration of the stage up to date practically in real time. It is preferably provided that, at the end of the decompression stage, the hour hand 13 jumps into the third zone 103 of the second graduations to indicate to the diver that his stage has finished and that he may start to resurface again.

Thus the positioning of the hour hand 13 in the third zone 103, or neutral zone, confirms to the user of the watch 100 that there is no longer any decompression stage to be effected in the ascent.

Use of the third zone 103 can be omitted in a variant implementation, by providing that, at the end of the decompression stage, the hour hand 13 restarts indicating opposite the first zone 101 of the second graduations the value of the remaining duration before having to perform a new decompression stage. Thus the diver knows how much time he can still stay submerged after having performed the decompression stage, the new displayed remaining duration obviously being updated in real time as a function of the changing depth of the diver.

In general terms and as in the first embodiment, the algorithm which is used takes into account the case of successive dives as well as the altitude of the surface of the stretch of water in which the diving is taking place, means being further provided to allow the display of data relating to the dive in response to actuation of the winding-button 7 in the diving mode, to allow the display of data relating to the last dive in the time mode and to allow activation of a historical mode.

Furthermore means can be provided to allow display of the course of the safety stage at 5 meters, such as has been described above. Thus, even in the case in which no decompression stage is to be effected during the ascent, it can be provided that, when the diver stays at a depth of around 5 meters for 10 seconds for example, the hour hand 13 jumps directly to face the supplementary indication 105 corresponding to a stage time of 3 minutes. The hour hand then turns clockwise until the end of the 3 minutes, whereupon it returns to the neutral zone 103 of graduations to indicate to the diver that he may resurface with total safety.

The schematic diagram described previously with reference to the preceding embodiment and FIG. 2 is equally applicable to the present embodiment. The functional elements of the electronic circuit are thus common to the two described embodiments.

In one variant embodiment, the end of the second zone 102 of the second graduations, between positions corresponding to 50 and 51 minutes, may be arranged to be distinguished from the rest of the zone 102, by a different colour or addition of a special symbol for example. Thus the diver is easily warned about the fact that the duration of the decompression stage which he needs to effect during ascent risks being too large, or even that a second decompression stage at 6 meters depth will be necessary.

As described above in relation to the first embodiment, it is provided to equip the watch in the present embodiment with an alarm, preferably audible. The alarm here has two modes of operation, with which two respective different audio frequencies are preferably associated, or two respective different sequences of the signals. Thus a first mode of operation of the alarm can be provided during a first diving phase, namely when the maximum remaining duration is still not zero. In this case the function is similar to that described in relation to the first embodiment, that is to say an audible signal emitted at a first frequency or following a first sequence alerts the diver to the fact that the remaining duration has crossed a predetermined threshold. A second mode of operation can further be provided during a second phase of the dive, namely when a decompression stage is necessary during the ascent and this latter has not yet started. In this case, when the parameters of the dive in progress are such that the need to perform a stage at 6 meters depth is imminent, for example less that 2 minutes away, the controller circuit 21 controls the buzzer 28 to emit an audible signal at a second frequency or following a second sequence, to alert the diver to the risk arising. In such a situation it can equally be provided, possibly as an alternative but preferably in a supplementary manner, that the hour hand 13 is positioned directly at the end of the second zone 102 when the parameters of the dive in progress are such that the need to effect a stage at 6 meters depth is imminent. Thus the diver knows that he should ascend without delay, the hour hand 13 returning to its initial function of indicating the duration of the stage once the danger has gone, i.e. when the remaining duration before having to effect a stage at 6 meters has returned to a reasonable value.

The preceding description corresponds to preferred embodiments of the invention and should not in any event be considered to be limiting, in respect in particular of what concerns the structure described for the watch, the described functions, the nature and number of the control elements employed, the colours used or even the positioning of the graduations. More particularly, in what concerns the ergonomics of the display in the diving mode, it is noted that the association between a given hand and a specific display zone at the moment of reading is facilitated when their respective appearances are similar, the choice of identical colours, such as is described in the present application, forming a non-limiting example of realisation. In particular the dial may be lit or a variant embodiment is conceivable comprising a second hand, for example. Equally the invention is not limited to the described operating modes or to the possible passages from one mode to the other which have been described, to the extent that these parameters can be modified by suitable programming of the controller circuit. The man skilled in the art will not encounter any particular difficulty in adapting the functioning of the watch according to the present invention to his own requirements.

What is claimed is:

1. An electronic diving watch comprising a sealed case containing a timepiece movement covered by a dial, the watch comprising at least first graduations corresponding to time indications, said timepiece movement comprising electronic circuits adapted to generate time signals for motor means controlling at least respective first and second analog display organs, said analog display organs being disposed above the dial to display the current time in a first mode of operation called the time mode, the watch further comprising a pressure sensor adapted to produce electric signals representing the surrounding pressure and to supply said signals to the said electronic circuits, the diving watch having at least a second mode of operation in which display of data relating to the performance of diving is provided, wherein the display of said data relating to the performance of diving is effected by at least one of said display organs in connection with said first graduations corresponding to the time indications, wherein said data relating to the diving are representative of the maximum remaining duration during which the user of the watch can continue with a current dive before needing to perform a decompressing stage during the ascent, and wherein said first display organ is further arranged to be able to move in the anticlockwise sense relative said first graduations to indicate said remaining duration.

2. The diving watch according to claim 1, wherein said electronic circuits comprise means allowing a single stage to be defined to be effected by the user in the event of exceeding said maximum remaining duration and to control said first display organ in such a manner that it displays the duration of said stage with respect to second graduations.

3. The diving watch according to claim 1, wherein said data relating to the performance of diving are further representative of the instantaneous depth, the display of the instantaneous depth being realised by said second display organ in connection with said first graduations and wherein said second display organ is also arranged to be able to move in the anticlockwise sense.

4. The diving watch according to claim 2, wherein said data relating to the performance of diving are further representative of the instantaneous depth, the display of the instantaneous depth being realised by said second display organ in connection with said first graduations and wherein said second display organ is also arranged to be able to move in the anticlockwise sense.

5. The diving watch according to claim 1, wherein the dial has second graduations whose unit is the minute and which is divided into at least a first and a second zone with different respective visual appearances.

6. The diving watch according to claim 5, wherein it further comprises a third zone in said second graduations, the first zone preferably extending in the anticlockwise sense from the position corresponding to the indication 59 minutes of the first graduations over at least two thirds of the circumference of the dial while the second zone is defined by the complement of said first zone up to the position corresponding to the indication 1 minute of the first graduations and preferably having the colour orange, said first zone being of a different colour, the third zone being comprised between the positions corresponding respectively to the indications 1 minute and 59 minutes of the first graduations, preferably exhibiting a third colour and serving to indicate in relation to said first display organ that the maximum remaining duration has attained a value of zero.

7. The diving watch according to claim 1, wherein the display of a countdown of predetermined duration, preferably of the order of 3 minutes, is realised by said first organ or hour hand, in an automatic manner and in connection with said first graduations, when the user ascends to a predetermined depth, preferably of the order of 5 meters.

8. The diving watch according to claim 5, wherein the first zone preferably extends, in the clockwise sense, from the position corresponding to the indication 59 minutes of the first graduations over at least three quarters of the circumference of the dial and indicates in connection with the hour hand the maximum remaining duration before having to perform a decompression stage, starting from the moment when said maximum remaining duration is less than the duration indicated at the end of the first zone, while the second zone is defined by the complement of said first zone over a complete circumference, the second zone comprising a scale of supplementary graduations whose unit is the minute, indicating in connection with the hour hand the duration of a single stage to be effected by the user at a predetermined depth in case of exceeding said maximum remaining duration.

9. The diving watch according to claim 8, wherein the second graduations comprise a third zone, preferably of green colour, centred on the twelve hour position and extending over less than four minutes, the corresponding ends of said two first zones being offset in consequence, said third zone allowing indication, in relation to the hour hand that the decompression stage to be effected has ended and that the user of the watch may start to resurface in complete safety.

10. The diving watch according to claim 1, wherein it comprises at least one control member whose movements are detected by said electronic circuits and wherein means are provided such that, in the diving mode of operation, a display of the elapsed duration of the current dive is given by said first organ in response to actuation of said control member while a display of the maximum depth attained during the current dive is given by said second display organ.

11. The diving watch according to claim 1, wherein it comprises memory means and at least one control member whose movements are detected by said electronic circuits, and wherein a display of the total duration of the last effected dive is given by said first display organ in response to first actuation of said control member during the time mode of operation, while a display of the maximum depth attained by the user during said last dive is given by said second display organ in connection with said first graduations.

12. The diving watch according to claim 11, wherein means are provided such that a third mode of operation or historical mode is adapted to be activated in response to a predetermined sequence of actuations of said control member, in which mode each of said display organs reproduces its behaviour in the last dive with scales of time and depth adapted to the parameters of the last dive.

13. The diving watch according to claim 12, wherein it is provided that, in the case of dives whose maximum depth attained does not exceed 6 meters, the behaviour of the second display organ is reproduced in the historical mode in such a manner that the indications provided by the first graduations correspond to ten times the depth effectively indicated by said second display organ.

14. The diving watch according to claim 11, wherein said memory means are adapted to store the measurements effected at least in the course of the last two dives, sorting these in chronological rank, and wherein supplementary means are provided such that, prior to the display of said measurements, the display organs come together facing the first graduations to indicate the rank of the corresponding dive, action on said control member enabling passage from one dive to another.

15. The diving watch according to claim 1, wherein means are provided to detect the start of a dive and to activate the diving mode automatically.

16. The method of displaying data relating to the practise of diving on a diving watch comprising a sealed case containing a timepiece movement covered by a dial, the watch comprising at least first graduations corresponding to time indications, said timepiece movement comprising electronic circuits adapted to generate time signals for motor means controlling respectively at least a first and a second analog display organ, said analog display organs being disposed above the dial to display the current time in a first mode of operation called the time mode, the watch further comprising a pressure sensor adapted to produce electric signals representing the surrounding pressure and to provide said signals to said electronic circuits, the diving watch comprising at least a second mode of operation in which a display of data relating to the practise of diving is provided, wherein said data relating to diving represent the maximum remaining duration during which the user of the watch can continue a current dive before having to effect a decompression stage during the ascent, and wherein said first and second organs are hands respectively indicating hours and minutes in the time mode of operation, and wherein said first graduations comprise in particular minute indications and wherein on switching to the diving mode, the hour hand is positioned initially at a predetermined position and wherein, from the moment when said maximum remaining duration becomes less than the duration corresponding to said predetermined position, said hour hand starts to rotate, initially in the anticlockwise sense, in such a manner as to display said remaining duration at each instant, in connection with said first graduations.

17. The display method according to claim 16, wherein, after said maximum remaining duration has reached a value of zero, said hour hand displays the duration of a decompression stage to be effected at a predetermined depth during the ascent, in connection with supplementary graduations.

* * * * *